United States Patent [19]

Olsson et al.

[11] Patent Number: 5,094,475
[45] Date of Patent: Mar. 10, 1992

[54] GAS GENERATOR

[75] Inventors: Jan Olsson, Partille; Lars-Gunnar Skotte, Göteborg, both of Sweden

[73] Assignee: General Engineering (Netherlands) B.V., Utrecht, Netherlands

[21] Appl. No.: 572,943

[22] PCT Filed: Nov. 24, 1989

[86] PCT No.: PCT/SE89/00683
§ 371 Date: Sep. 20, 1990
§ 102(e) Date: Sep. 20, 1990

[87] PCT Pub. No.: WO90/05651
PCT Pub. Date: May 31, 1990

[30] Foreign Application Priority Data
Nov. 24, 1988 [GB] United Kingdom ............... 8827420

[51] Int. Cl.$^5$ .............................................. B60R 21/28
[52] U.S. Cl. ................................... 280/741; 280/732; 280/736; 280/742
[58] Field of Search ............... 280/736, 740, 741, 742, 280/730, 731, 732

[56] References Cited
U.S. PATENT DOCUMENTS

| 3,476,403 | 11/1969 | Richardson | 280/740 |
| 3,602,526 | 8/1971 | Brawn | 280/740 |
| 3,711,115 | 1/1973 | Lohr | 280/736 |
| 3,778,084 | 12/1973 | Sutherland et al. | 280/741 |
| 3,813,007 | 5/1974 | Doin et al. | 280/736 |
| 3,836,167 | 9/1974 | Wilson | 280/736 |
| 3,904,221 | 9/1975 | Shiki et al. | 280/741 |
| 3,917,023 | 11/1975 | De Rosa | 280/736 |
| 4,878,690 | 11/1989 | Cunningham | 280/736 |

FOREIGN PATENT DOCUMENTS 1290418 9/1972 United Kingdom .
1371506 10/1974 United Kingdom .
1381999 1/1975 United Kingdom .

Primary Examiner—Kenneth R. Rice
Attorney, Agent, or Firm—Spencer & Frank

[57] ABSTRACT

Inflatable air-bag for use in a motor vehicle has a gas generator unit which includes at least one charge of cellulose nitrate having a mass of less than 10 grams. Gas from the charge, when ignited, is directed to the interior of the air-bag by a tube having a number of holes positioned along the length of the tube providing communication between the center of the tube and the air-bag. The tube is provided with a part of the charge of cellulose nitrate at each end of the tube.

9 Claims, 2 Drawing Sheets

GAS GENERATOR

BACKGROUND OF THE INVENTION

THE PRESENT INVENTION relates to a gas generator and more particularly relates to a gas generator suitable for use in a safety arrangement intended to be incorporated into a motor vehicle such as a motor car.

It has been proposed previously to provide motor cars with safety arrangements in the form of so-called "air-bags".

Such air-bags are mounted at a convenient position within a motor vehicle and are arranged so that, in the event of an accident arising, the air-bag is inflated to form a cushion for a passenger within the motor car. A typical conventional air-bag had an inflated volume of between 60 and 160 liters.

A typical prior proposed air-bag is inflated with a gas which is generated rapidly, subsequent to an accident occurring, by a gas generator. A typical gas generator utilises a material such as a mixture of sodium um azide ($NaN_3$), Potassium nitrate ($KNO_3$) and Silicon dioxide ($SiO_2$) in the form of pellets. These pellets, when ignited, produce rapidly a non-poisonous gas which consists primarily of nitrogen. 1 gram of the tablets provides 1 liter of gas and thus a total charge of between 60 and 160 grams of pellets is required.

Whilst the pellets, when ignited, produce a non-poisonous gas, the pellets also produce dust, which is poisonous. The hot dust could also damage the interior of the bag. Therefore in prior proposed air-bags which utilise the pellets as described, a filter is provided between the pellets and the interior of the bag. U.S. Pat. No. 3,904,221 discloses a typical prior art arrangement which is relatively expensive to produce and which is bulky. The pressure within an air-bag when inflated by a gas generator of this type is in the region of 0.5 bar and the time taken to inflate the bag is typically in the region of 25–30 ms.

One disadvantage of an air-bag system as described above is that of expense. Consequently it has been proposed that if a complement is required to a conventional air-bag, or to a safety-belt, in the form of an additional inflatable arrangement, then for economic reasons this complement must be cheap to produce.

It has been considered desirable to provide an inflatable bag located to one side of each passenger, the volume of which is in the region of 5–25 liters, as a complement to a conventional air-bag or safty-belt. These bags can be termed "inflatable paddings". These inflatable paddings are intended to provide protection against the side impact, but if such inflatable paddings are to be utilised they must be relatively cheap to manufacture, and thus the prior proposed gas generators are not really suitable.

It is to be understood that if an inflatable padding is to be of use in protecting a passenger against the side impact, then that inflatable padding must be inflated in an extremely short period of time subsequent to the sensing of an accident. The reason for this is that in the case of a side impact, typically the door structure of the vehicle will begin to collapse as soon as the impact occurs, since the door structure is not very strong. A sensor is provided which is responsive to a side impact. Such a sensor may respond to deformation of the door panel. However, even if the sensor responds very rapidly it is to be understood that by the time the sensor responds the door will have significantly collapsed, and the interior of the door will be extremely close to the person sitting inside the car. Thus the bag must be inflated extremely rapidly if it is to be of any real use. It is also to be appreciated that the ideal location for such an inflatable padding is within the door itself, and thus the bag needs to be extremely compact when de-flated, and the associated gas generator must be small.

It has been found that the pressure within such an inflated padding should be somewhat higher than in a conventional air-bag, preferably in the region of 1-2 bars.

It has also been proposed to use cellulose nitrate for a gas generator in an air-bag. British Patent Specification 1371506 discloses such an arrangement in which 75 grams of propellent are utilised, consisting principally of a mixture of nitro glycerine and nitro cellulose. Such a propellent will produce gas having a volume of approximately 180 liters when ignited. The gas produced is toxic and thus the arrangement disclosed in the British Patent Specification includes means provided to avoid problems that may arise if the toxic gas emerges from the bag and is breathed by people restrained by the bag. In the Specification there is a teaching that a vapourisable cooling liquid should be provided, which effects purification of the combustion gases by oxidation of the toxic constitutes thereof to form non-gaseous products. The apparatus disclosed is therefore relatively complicated.

SUMMARY OF THE INVENTION

According to this invention there is provided a gas generator unit for an inflatable safety arrangement in a motor vehicle, said gas generator comprising at least one cellulose nitrate charge, means to ignite the charge and means to direct gas from the charge, when ignited, to the interior of an inflatable bag or the like, the charge of cellulose nitrate having a mass of less than 10 grams.

Since a charge of nitro cellulose of less than 10 grams is utilised, the amount of toxic gas that is generated is not very great, perhaps up to 30 liters by volume at the pressure at which the gas is supplied to the air-bag. This is not a sufficient volume of gas, even though it is toxic, to harm a person, even if the gas should escape from the safety arrangement.

Preferably the gas generator unit comprises a tube, with a number of holes formed in it along its length, said charge being mounted on the tube to direct gas from the charge, when ignited, to the interior of the tube, so that the gas can pass through the holes into said inflatable bag.

Conveniently two such charges are provided, each charge being mounted on a respective end of the tube.

Advantageously the or each charge is ignited by means of an electric ignitor.

Preferably each ignitor is surrounded by gun powder which is embedded in the cellulose nitrate.

Conveniently wherein the holes are spaced apart along the tube in a single line, the axis of at least some holes being inclined to the axis of the tube.

Preferably the number of holes is between five holes and twenty holes.

Conveniently the total area of the holes is selected to be between 20 and 100 millimeters square.

Preferably the total charge of cellulose nitrate is between 1 and 7 grams.

The generator may be a gas generator unit in combination with an inflatable padding which initially surrounds the exterior of the tube. The inflatable padding, when inflated may have a volume of between 5 and 25 liters.

BRIEF DESCRIPTION OF THE DRAWINGS

In order that the invention may be more readily understood, and so that further features thereof may be appreciated, the invention will now be described, by way of example, with reference to the accompanying drawings in which.

DESCRIPTION OF THE PREFERRED EMBODIMENTS

Figure 1:
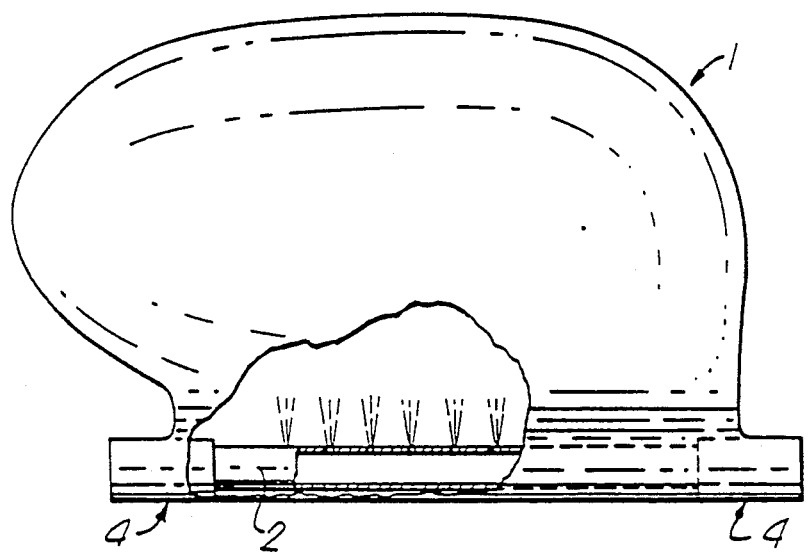
FIG. 1 is a perspective view of an inflatable padding in accordance with the invention when inflated with parts thereof cut away.
Figure 2:
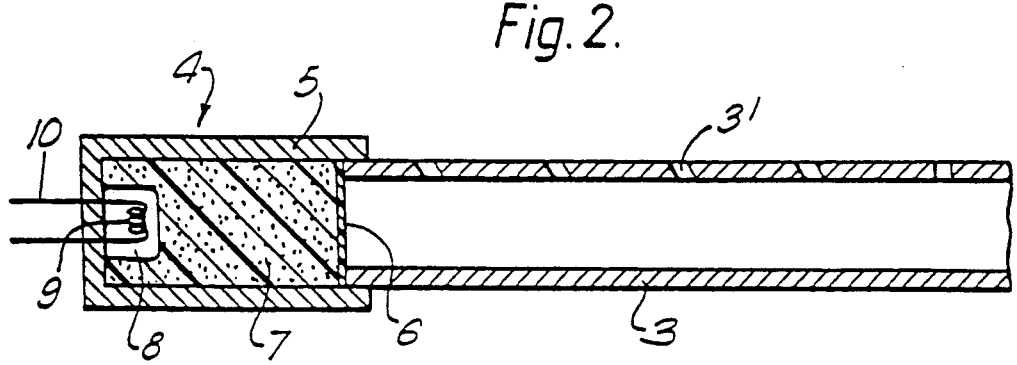
FIG. 2 is an enlarged view of an end portion of a tube forming part of the gas generator for the inflatable padding of FIG. 1, prior to inflation of the bag.

Referring initially to FIGS. 1 and 2, an inflatable padding incorporating a gas generator in accordance with the invention consists of a bag 1 which, when inflated, has a volume of between 5 and 25 liters. Contained within the bag is a gas generating unit 2.

The gas generating unit 2, as can be seen more clearly in FIG. 2, comprises an elongate tube 3. Formed within the surface of the tube 3 are a plurality of apertures 3', arranged in a linear manner. Each aperture 3' is inclined to the longitudinal axis of the tube 3.

Mounted on each end of the tube 3 is a gas generating element 4. Each gas generating element 4 comprises a housing 5 mounted on the end of the tube 3. A breakable seal 6, for example formed of plastics material is provided between the end of the tube 3 and the interior of the housing 5. The interior of the housing 5 is substantially filled with cellulose nitrate 7 which is retained in position by the seal 6, and embedded within the cellulose nitrate is a charge of gun power 8 within which is embedded an electrical ignitor 9 having leads 10 which pass through the housing 5 to an appropriate ignition circuit.

In a typical embodiment of the invention the tube 3 has a length of 20 centimeters and a diameter of 2 centimeters, with twelve holes 3' being provided at spaced apart positions in a single line extending along the tube, each hole having a diameter of 3 millimeters. It is to be understood, however, that the number of holes may be selected between five holes and twenty holes, and the total area of the holes may be in the region of 20-100 mm$^2$. In the illustrated embodiment, the axis of each hole 3' is inclined to the axis of the tube 3.

The width of the bag 1 when inflated is greater than the length of the tube 3. The holes 3' are inclined to the axis of the tube to direct gas into that part of the bag that extends beyond the end of the tube, thus ensuring that the bag is fully inflated as swiftly as possible.

It is envisaged that the charge of cellulose nitrate within each of the gas producing elements will be ignited simultaneously by a signal from the ignition circuit, and the cellulose nitrate will burn very swiftly to produce carbon monoxide and carbon dioxide. The cellulose nitrate does not produce any slag dust.

Figure 3:
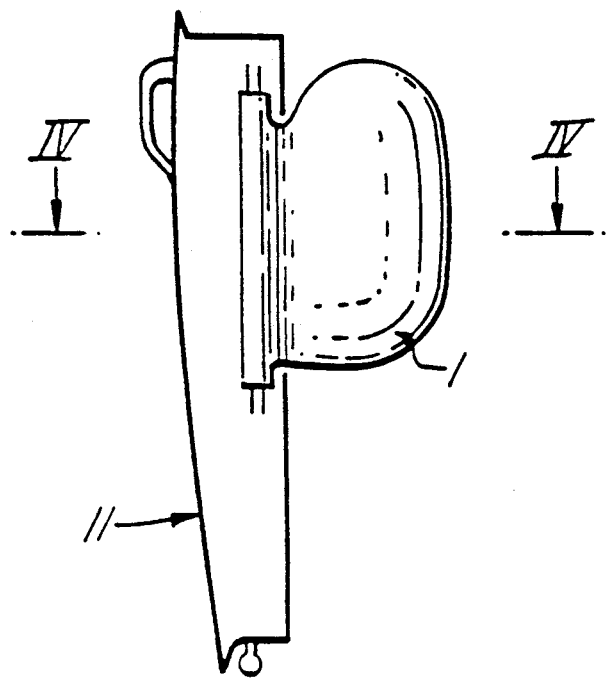
FIG. 3 is a top plan view of a door provided with an inflatable bag in accordance with the invention, when inflated.
Figure 4:
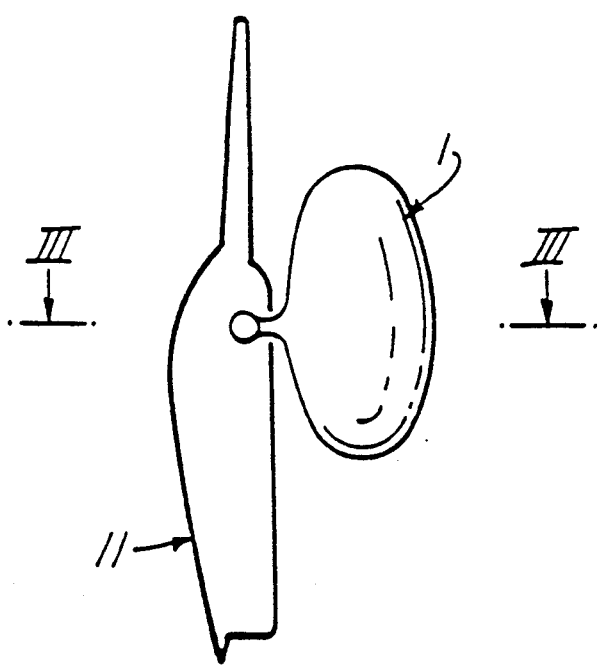
FIG. 4 is a vertical sectional view taken through the door of FIG. 3, illustrating the bag when inflated.

Because no slag dust is produced in igniting the charge there is no need to provide a filter construction, and this enables the gas generator to be relatively slim, thus facilitating the mounting of the gas generator within a door 11 of a motor vehicle as illustrated in FIGS. 3 and 4.

The fact that there are two gas generating elements mounted on opposed ends of the tube means that no re-coil is experienced when the gas elements are ignited because the two charges effectively balance each other.

It has been found that 1 gram of cellulose nitrate will provide approximately 4 or 5 liters of gas, that is to say approximately four times as much gas for the same amount of charge as compared with the conventional pellets. Consequently, for the described inflatable padding which has a volume of between 5 and 25 liters, a charge of between 1 and 7 grams is required. Embodiments of the invention may have a charge of up to 10 grams.

The cellulose nitrate burns rapidly, filling the inflatable padding in a time period of 5-10 ms.

In the most preferred embodiment of the invention the volume of the inflatable padding is 10 liters and the weight of the charge is 2.5 grams.

It is to be understood that the inflatable padding, as described, will, when inflated, contain a poisonous gas, namely carbon monoxide. The body can tolerate a certain amount of carbon monoxide if it is only present for a brief period of time. Whilst it is envisaged that some carbon monoxide may leak out of the inflatable padding, as described, it is not thought that this leakage of potentially poisonous gas will, in actual fact, cause any harm to passengers restrained by the inflatable padding.

We claim:

1. A safety arrangement in a motor vehicle, said safety arrangement being mounted within the door of the motor vehicle and comprising an inflatable bag means and a gas generator unit for generating gas to inflate the bag means, the gas generator unit comprising an elongate tube having a plurality of holes defined in the tube at positions spaced along the length of the tube, said tube being provided with a charge of ignitable material at each end of the tube, means being provided to ignite the said charges, the charges, when ignited, generating gas which is directed through the interior of the tube and through said holes into the interior of the inflatable bag means, each charge being cellulose nitrate, and the combined mass of the charges being less than 10 grams.

2. A safety arrangement according to claim 1, wherein each charge is ignited by means of an electric igniter.

3. A safety arrangement according to claim 2, wherein each igniter is surrounded by gun powder which is embedded in the cellulose nitrate.

4. A safety arrangement according to claim 1, wherein the said holes are spaced apart along the tube in a single line.

5. A safety arrangement according to claim 4, wherein the axis of at least some of said holes is inclined to the axis of the tube.

6. A safety arrangement according to claim 4, wherein the number of said apertures is between five and twenty.

7. A safety arrangement according to claim 4, wherein the total area of said holes is selected to be between 20 and 100 millimeters square.

8. A safety arrangement according to claim 1, wherein the total mass of the charges of cellulose nitrate is between 1 and 7 grams.

9. An inflatable safety arrangement comprising an inflatable air-bag and an associated gas generator unit, the gas generator unit comprising an elongate tube, with a number of holes formed at positions spaced along its length, a charge of cellulose nitrate being mounted on the tube and being adapted, when ignited, to generate gas which will flow along inside the tube and through the holes into the interior of the air-bag to be inflated, the charge comprising cellulose nitrate having a mass of between 1 and 7 grams, and means being provided to ignite the charge.

* * * * *